June 23, 1925.
M. M. O'LEAR
1,543,230
ADJUSTABLE HEADLIGHT
Filed May 21, 1924    2 Sheets-Sheet 1
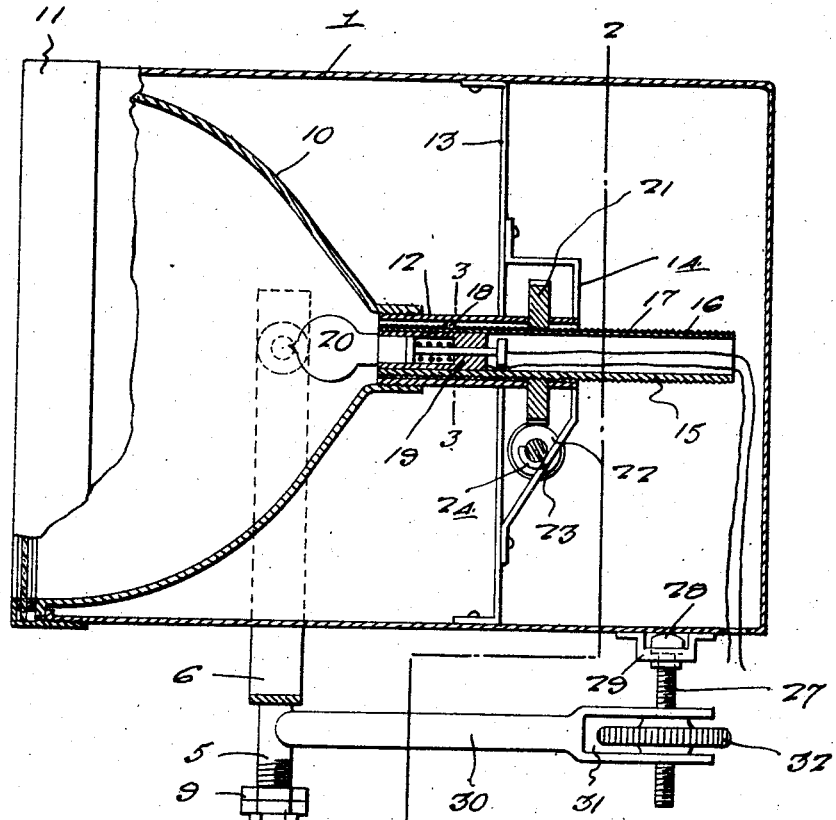
Fig. 1.
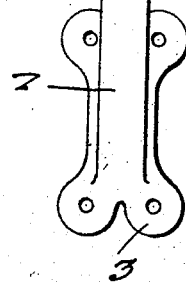
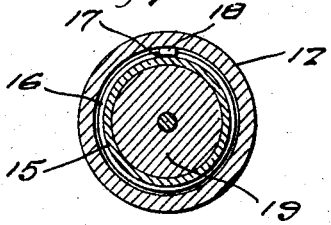
Fig. 3.
Inventor
M. M. O'Lear
By Clarence A. O'Brien
Attorney June 23, 1925.
M. M. O'LEAR
ADJUSTABLE HEADLIGHT
Filed May 21, 1924
1,543,230
2 Sheets-Sheet 2
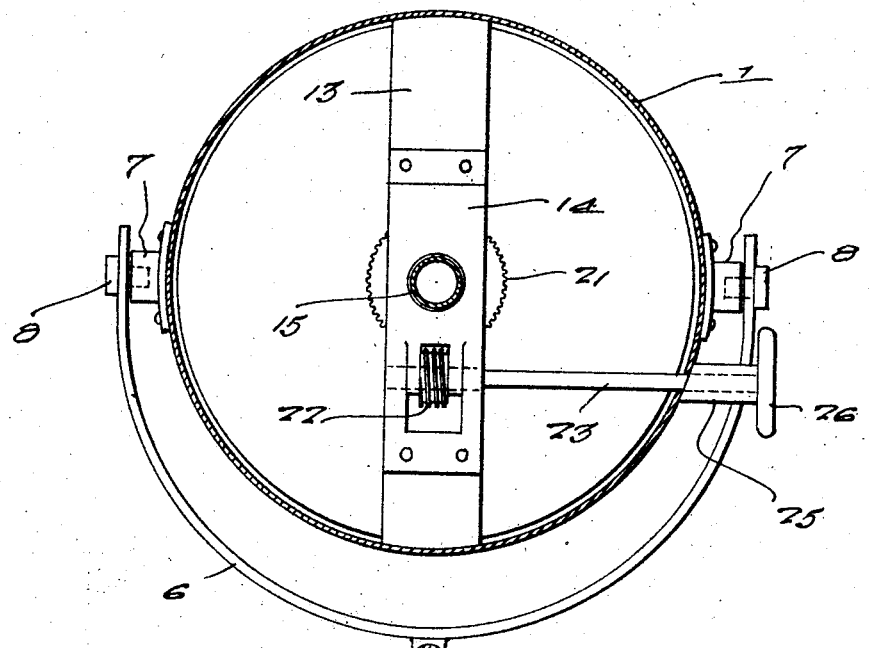
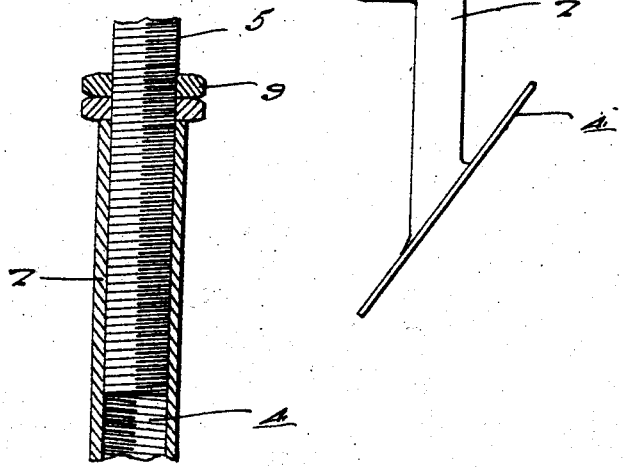
Inventor
M. M. O'Lear
By Clarence A. O'Brien
Attorney Patented June 23, 1925.

1,543,230

UNITED STATES PATENT OFFICE.

MARTIN M. O'LEAR, OF BRACKENRIDGE, PENNSYLVANIA.

ADJUSTABLE HEADLIGHT.

Application filed May 21, 1924. Serial No. 714,869.

*To all whom it may concern:*

Be it known that I, MARTIN M. O'LEAR, a citizen of the United States, residing at Brackenridge, in the county of Allegheny and State of Pennsylvania, have invented certain new and useful Improvements in Adjustable Headlights, of which the following is a specification.

This invention relates to new and useful improvements in headlight constructions and has for its principal object to provide a means whereby a headlight may be adjusted for regulating the direction in which the rays of light are projected, means being further provided for moving the lamp longitudinally in its casing.

A further object of the invention is to provide a headlight of the above mentioned character, wherein means is further provided for tilting the same.

A still further object is to provide a headlight construction of the above mentioned character, which will enable the operator of the vehicle to direct the rays of light in such a manner as not to blind the operator of an approaching vehicle, the headlight being further adapted for adjustment so that the operator of the vehicle may readily have a full and clear vision of the turn in the road so as to insure safe driving.

A further object is to provide a headlight of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same:

Figure 1 is a longitudinal sectional view of the casing and the parts arranged therein, the tilting and rotating means for the casing being shown in side elevation.

Figure 2 is a sectional view taken approximately on line 2—2 of Figure 1.

Figure 3 is a sectional view taken approximately on line 3—3 of Figure 1, and

Figure 4 is a sectional view of the supporting standard with the lower end of the lamp bracket supported therein.

In the drawings wherein for the purpose of illustration is shown the preferred embodiment of my invention, the numeral 1 designates the casing which is substantially cylindrical and has its forward end open and its rear end closed. For the purpose of supporting the casing I provide the tubular standard 2, the lower end of which is provided with the attaching flange 3 whereby the same may be secured on the vehicle in the manner well known in the art. The tubular standard is internally threaded as shown at 4 and receives in the upper end thereof the threaded shaft 5 on the upper end of which is arranged the substantially U-shaped bracket 6.

The casing 1 is provided at diametrically opposite points with the outwardly extending trunnions 7 and the same are adapted to cooperate with the bolts 8 which are carried by the outer free ends of the arms of the U-shaped bracket 6 whereby the casing is pivotally supported on the bracket. For the purpose of holding the bracket in any desired adjusted position, with respect to the standard 2, I provide the adjusting nut 9 and the purpose thereof will hereinafter be more fully described.

Arranged in the forward end of the casing is the reflector 10 and the same is supported in position therein by means of the clamping ring 11 which is threaded on the open forward end of the casing in the manner more clearly shown in Figure 1 of the drawings. As the construction of the reflector retaining means is well known in the art, a further detailed description of the same is not thought necessary.

Threaded into the rear central portion of the reflector 10 is the forward end of a sleeve 12. The sleeve is further supported in a horizontal position by means of the main bracket 13 which extends diametrically across the intermediate portion of the casing and the auxiliary bracket 14 which is associated with the main bracket 13 in the manner more clearly shown in Figure 1. Extending longitudinally through the sleeve 12 and adapted for longitudinal slidable movement therein is the elongated tubular member 15. The tubular member 15 is externally threaded as illustrated at 16 and is provided with a longitudinally extending slot 17 in which is adapted to operate the projection 18, the latter being carried by the sleeve 12 in the manner illustrated in Figure 1.

The provision of the slot 17 and the lug 18 is to provide a means for preventing the turning of the tubular member 15 when the same is actuated in the manner hereinafter to be more fully described. Supported in the forward end of the tubular member 15 is the lamp socket 19 which may be of any conventional construction and the same is insulated from the metallic tubular member 15 in any well known manner. An electric bulb 20 is adapted to be associated with the lamp socket 19 and is disposed within the reflector. For the purpose of actuating the tubular member 16 whereby the same may be moved longitudinally within the sleeve 12 I provide the worm gear 21 which is supported by the rear end of the sleeve 12 and is in threaded engagement with the externally threaded tubular member 15 for operating the same. A worm such as is shown at 22 is mounted on the inner end of the transversely extending shaft 23 which is supported by the upturned portions 24 of the auxiliary bracket 14 and the shaft extends through the side of the casing and a tubular extension 25 provided thereon. A handle such as is illustrated at 26 is provided on the outer end of the shaft 23 for rotating the same whereby the worm 22 on the inner end thereof will actuate the worm gear 21 whereby the tubular member 15 may be actuated so that the lamp 20 may be moved inwardly or forwardly with respect to the reflector 10 in the manner as is obvious from the construction shown.

When the lamp 20 is in the forward end of the casing, the beam of light will be relatively small. In this manner, the rays of light from the lamp may be regulated in a simple and efficient manner and the lamp will be held in any desired adjusted position with respect to the reflector.

For the purpose of enabling the headlight to be tilted in either an upward or downward direction, I provide the rear portion of the casing with a threaded bolt 27, the head 28 of which is supported in a suitable bracket 29 carried by the casing on the under side thereof. An arm 30 is disposed laterally with respect to the shank 5 and the free end thereof is bifurcated as illustrated at 31. The bifurcated or forked end of the arm 30 is provided with registering apertures in the arms thereof for receiving the threaded bolt 27 and a knurled nut 32 is associated with the threaded bolt 27 and is disposed within the forked portion 31 of the arm 30 for tilting the casing on its pivotal supports 7 and 8 and it will be readily seen that by turning the nut in one direction, the bolt 27 will move upwardly so as to cause the forward end of the casing and the lamp mounted therein to be directed downwardly. A reverse rotation of the nut will cause the bolt to move downwardly simultaneously raising the forward end of the casing whereby the rays of light from the lamp will be directed upwardly.

For the purpose of turning the headlight with respect to the supporting standard 2, the adjusting nut 9 is provided and by rotating the same, the shank 5 and the bracket supported on the upper end thereof together with the casing may be turned in either direction as is desired.

A headlight construction of the above mentioned character, may be used on automobiles, trains, or ships and I do not wish to limit myself to the particular use of my headlight. Furthermore the provision of the several adjusting means enables the headlight to be controlled for regulating the direction of the rays of light from the lamp and when in use upon a motor vehicle, the headlight may be adjusted to prevent the glaring lights from affecting the operator of an approaching vehicle, and furthermore the headlight may be turned so that the rays of light therefrom will be directed to the side of the road so as to enable the operator of the vehicle to readily see the turns in the road and thereby provide for the safety driving of the vehicle. The simplicity of my device enables the same to be manufactured at a very low cost and furthermore will be strong and durable.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A headlight comprising a casing open at its forward end, a bracket for pivotally supporting said casing, a reflector mounted in said casing, a lamp supported in the casing and extending within the reflector, means for moving the lamp longitudinally in the casing with respect to the reflector comprising a sleeve supported at its forward end in the rear portion of the reflector, a bracket in the casing for supporting the rear end of the sleeve, a tubular member extending longitudinally in the sleeve, a lamp socket in the forward end thereof for supporting the lamp, said tubular member being externally threaded and provided with a longitudinally extending slot on the outer face thereof, a projection carried by the sleeve and operating in said groove for preventing the rotation of the tubular member in the sleeve, a gear wheel supported by the rear end of the sleeve and threaded for engagement with the threaded tubular member, and means for actuating said gear wheel whereby the tubular member is moved longitudinally within the sleeve.

2. A headlight comprising a casing open at its forward end, a bracket for pivotally supporting said casing, a reflector mounted in said casing, a lamp supported in the casing and extending within the reflector, means for moving the lamp longitudinally in the casing with respect to the reflector comprising a sleeve supported at its forward end in the rear portion of the reflector, a bracket in the casing for supporting the rear end of the sleeve, a tubular member extending longitudinally in the sleeve, a lamp socket in the forward end thereof for supporting the lamp, said tubular member being externally threaded and provided with a longitudinally extending slot on the outer face thereof, a projection carried by the sleeve and operating in said groove for preventing the rotation of the tubular member in the sleeve, a gear wheel supported by the rear end of the sleeve and threaded for engagement with the threaded tubular member, means for actuating said gear wheel whereby the tubular member is moved longitudinally within the sleeve, said last mentioned means comprising a shaft extending transversely through the casing, the inner end thereof being supported by the bracket in the casing, a gear carried thereby for engagement with the aforementioned gear, and a handle on the outer end of the shaft for actuating the same.

In testimony whereof I affix my signature.

MARTIN M. O'LEAR.